3,113,158
PROCESS FOR PREPARING VINYL CHLORIDE
Armin Jacobowsky, Knapsack, near Cologne, Germany, assignor to Knapsack-Griesheim Aktiengesellschaft, Knapsack, near Cologne, Germany, a corporation of Germany
No Drawing. Filed Dec. 7, 1960, Ser. No. 74,227
12 Claims. (Cl. 260—656)

The present invention relates to a process for preparing vinyl chloride from acetylene and hydrogen chloride by introducing these two reaction components into an aqueous solution of hydrochloric acid and a cuprous and/or mercuric salt.

It is known to prepare vinyl chloride by introducing acetylene and hydrogen chloride into an aqueous solution or suspension of mercuric chloride in hydrochloric acid. It has also been proposed to use ketones, alcohols, chlorinated or unchlorinated hydrocarbons instead of water as solvents or dispersing agents. Instead of mercuric chloride copper salts, salts of heavy metals of groups 2, 5 and 7 of the periodic table and ferric chloride may be used as catalysts. It is also known to use ammonium chloride, a salt of an alkaline or an alkaline earth metal or a salt of a tertiary amine as additive improving the solubility of the catalyst.

It has now been found that the activity of catalyst solutions of cuprous and/or mercuric salts in hydrochloric acid is considerably improved when hydrogen phosphide or a substituted phosphine is added to the said solutions before they are used. It is quite obvious that the products which then form by the addition reaction of the hydrogen phosphide with the metal chlorides act as catalysts in the additive combination of hydrogen chloride with acetylene.

The process according to the invention has the advantage of considerably increasing the activity of the catalyst and of enabling vinyl chloride to be obtained which has a high degree of purity and which is free from impurities such as acetaldehyde, dichlorethane or trichlorethane.

In the process according to the invention acetylene and hydrogen chloride are introduced into an aqueous solution of a cuprous salt and/or a mercuric salt in hydrochloric acid, to which hydrogen phosphide has been added. As cuprous or mercuric salts there are in particular used the corresponding chlorides. Instead of hydrogen phosphide (phosphine, $PH_3$) organic substitution products thereof may be used, for example, methyl phosphine, trimethyl phosphine or methyl ethyl phosphine. Other substitution products, for example those containing aryl groups, may also be used and produce a catalytic effect. Diphosphine ($P_2H_4$) may also be used.

The concentration of hydrochloric acid in the solution is advantageously such that about 6 to about 13 mols, preferably about 8 to about 10 mols, of HCl are present per liter of catalyst solution. The solutions of hydrochloric acid contain about 0.5 to about 6 mols, preferably about 1 to about 3.5 mols, of cuprous chloride and/or mercuric chloride per liter of catalyst solution.

According to another embodiment of the invention the hydrogen chloride introduced into the catalyst solution may be replaced completely or partially by hydrochloric acid, the hydrochloric acid that is added having a concentration of 10.5 to 40% by weight, which corresponds to about 3.0 to about 13.1 mols of HCl per liter. When hydrogen chloride is replaced by hydrochloric acid the water introduced with the hydrochloric acid is evaporated by the heat of formation of vinyl chloride and, in certain cases, by the additional heating of the catalyst solution and it is thus removed from the catalyst solution.

The phosphorus content of the catalyst solution which depends on the addition of hydrogen phosphide or a derivative thereof is in general within the range of about 0.01 to about 0.4% by weight, advantageously about 0.03 to about 0.2% by weight, the percentages being calculated on the total solution.

The process is carried out at temperatures within the range of about 60° to about 140° C., preferably at temperatures within the range of about 75° to about 100° C., and under pressures of 1 to 5, preferably about 1.5 to about 3, atmospheres.

The following examples serve to illustrate the invention but they are not intended to limit it thereto.

EXAMPLE 1

(a) Known Method 40 liters (measured at N.T.P.) of acetylene and 45 liters (at N.T.P.) of hydrogen chloride were introduced per hour at 95° C. into 1.69 liters of a solution of mercuric chloride in hydrochloric acid which contained 1 mol per liter of $HgCl_2$ and 9.1 mols per liter of HCl. After the reaction product that had formed had been washed, neutralized, dried and subjected to a distillation, 99.5 grams of vinyl chloride were obtained. The extent of conversion amounted to 91%, calculated on the quantity of acetylene used. The activity of the catalyst enabled 59 grams of vinyl chloride to be obtained per liter of catalyst solution and per hour.

(b) Method According to the Invention

Into a catalyst solution analogous to that described sub (a) hydrogen phosphide prepared from $Zn+HCl+P$ was introduced whereupon the content of phosphorus of the catalyst solution amounted to 0.18% by weight.

The catalyst solution which had thus been treated was charged per hour, at 95° C., with 50 liters (at N.T.P.) of acetylene and 55 liters (at N.T.P.) of hydrogen chloride and after the working up 127 grams of pure vinyl chloride were obtained. By-products could not be observed. The extent of conversion was 90%, calculated on the quantity of acetylene used. The rest partly left the reaction solution without having undergone conversion and partly was dissolved in the reaction solution. The activity of the catalyst enabled 75 grams of vinyl chloride to be obtained per liter of catalyst solution and per hour. Owing to the addition of $PH_3$ to the catalyst solution the yield obtained by the activity of the catalyst was by 27% superior to that obtained by the known method in which no $PH_3$ was used.

EXAMPLE 2

(a) Known Method 40 liters (at N.T.P.) of acetylene and 45 liters (at N.T.P.) of hydrogen chloride were introduced per hour, at 92° C., into 2.75 liters of a solution of mercuric chloride and cuprous chloride in hydrochloric acid which contained 0.19 mol per liter of $HgCl_2$, 1.53 mols per liter of CuCl and 9.8 mols per liter of HCl. The condensate of the reaction product which was contaminated with dissolved acetylene yielded 99.0 grams of vinyl chloride. The extent of conversion amounted to 88%, calculated on the quantity of acetylene used. The activity of the catalyst enabled 36 grams of vinyl chloride to be obtained per liter of catalyst and per hour.

(b) Method According to the Invention

Into a catalyst solution analogous to that described in the first part of this example hydrogen phosphide was introduced. The catalyst solution then contained 0.03% by weight of phosphorus.

Into the phosphorus-containing catalyst solution which had thus been prepared, 56 liters (at N.T.P.) of acetylene and 62 liters (at N.T.P.) of hydrogen chloride were introduced per hour at 90° C. and 140 grams of pure vinyl chloride were obtained. By-products could not be observed. The extent of conversion amounted to 89%, calculated on the quantity of acetylene used. The activity of the catalyst enabled 51 grams of vinyl chloride to be obtained per liter of catalyst solution and per hour.

Owing to the addition of $PH_3$ to the catalyst solution the activity of the catalyst was increased by about 42%.

EXAMPLE 3

*(a) Method Carried Out in the Absence of Phosphorus*

50 liters (at N.T.P.) of acetylene and 210 cc. of hydrochloric acid of 30.1% strength which had been preheated to 100° C. were introduced per hour at 103° C. into 2 liters of a heated solution containing, per liter, 0.2 mol of $HgCl_2$, 2.0 mols of CuCl and 7.5 mols of HCl.

The water vapor was removed from the reaction product by condensation. The product was washed, neutralized, dried and subjected to a distillation which yielded 106 grams of pure vinyl chloride. The extent of conversion amounted to 76%, calculated on the quantity of acetylene used. The activity of the catalyst enabled 53 grams of vinyl chloride to be obtained per liter of catalyst and per hour.

This method is not known in itself since the addition of hydrochloric acid to the catalyst solution which replaced the addition of hydrogen chloride is a novel measure.

*(b) Method According to the Invention Carried Out in the Presence of Phosphorus*

Methyl phosphine was introduced into a catalyst solution analogous to that described in the first part of this example. The catalyst solution then contained 0.11% by weight of phosphorus.

Into this phosphorus-containing catalyst solution 60 liters (at N.T.P.) of acetylene and 250 cc. of hydrochloric acid of 30.1% strength which had been preheated to 100° C. were introduced per hour at 102° C. and after the working up of the reaction product 134 grams of pure vinyl chloride were obtained. No by-products could be perceived. The extent of conversion amounted to 80%, calculated on the quantity of acetylene used. The activity of the catalyst enabled 67 grams of vinyl chloride to be obtained per liter of catalyst solution and per hour.

By the addition of $PH_2$—$(CH_3)$ to the catalyst solution the yield obtained by the activity of the catalyst was increased by about 26%.

I claim:

1. A process for preparing vinyl chloride from acetylene and hydrogen chloride which comprises introducing said components into an aqueous catalyst solution containing hydrochloric acid and at least one salt selected from the group consisting of cuprous chloride and mercuric chloride and to which at least one substance selected from the group consisting of phosphine, diphosphine and methylphosphine has been added.

2. A process as claimed in claim 1 wherein the added substance is methyl phosphine.

3. A process as claimed in claim 1 wherein the concentration of hydrochloric acid in the catalyst solution amounts to about 6 to about 13 mols of HCl per liter of catalyst solution.

4. A process as claimed in claim 3 wherein the concentration of hydrochloric acid in the catalyst solution amounts to about 8 to about 10 mols of HCl per liter of catalyst solution.

5. A process as claimed in claim 1 wherein solutions of hydrochloric acid are used which contain about 0.5 to about 6 mols of at least one substance selected from the group consisting of cuprous chloride and mercuric chloride per liter of catalyst solution.

6. A process as claimed in claim 5 wherein solutions of hydrochloric acid are used which contain about 1 to about 3.5 mols of at least one substance selected from the group consisting of cuprous chloride and mercuric chloride per liter of catalyst solution.

7. A process as claimed in claim 1 wherein the hydrogen chloride that is added to the catalyst solution is completely replaced by hydrochloric acid having a concentration of 10.5 to 40% by weight, which corresponds to about 3.0 to about 13.1 mols, of HCl per liter.

8. A process as claimed in claim 1 wherein the hydrogen chloride that is added to the catalyst solution is partially replaced by hydrochloric acid having a concentration of 10.5 to 40% by weight, which corresponds to about 3.0 to about 13.1 mols, of HCl per liter.

9. A process as claimed in claim 1 wherein the quantity of phosphorus contained in the catalyst solution is within the range of about 0.01% to about 0.4% by weight, calculated on the total solution.

10. A process as claimed in claim 9 wherein the quantity of phosphorus contained in the catalyst solution is within the range of about 0.03 to about 0.2% by weight, calculated on the total solution.

11. A process as claimed in claim 1 wherein temperatures within the range of about 60° to about 140° C. and pressures within the range of about 1 to about 5 atmospheres are applied.

12. A process as claimed in claim 11 wherein temperatures within the range of about 75° to about 100° C. and pressures within the range of about 1.5 to about 3 atmospheres are applied.

References Cited in the file of this patent

UNITED STATES PATENTS 2,407,701    Jones et al.   _____ Sept. 17, 1946

OTHER REFERENCES

Mellor's Modern Inorganic Chemistry, Longmans Green and Co. (London), 1952, p. 760.